(12) United States Patent
Baba

(10) Patent No.: US 7,898,915 B2
(45) Date of Patent: Mar. 1, 2011

(54) METHOD AND APPARATUS FOR DETERMINING RECORDING POWERS FOR RECORDING ON AN OPTICAL DISC

(75) Inventor: Nobuyuki Baba, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 12/410,837

(22) Filed: Mar. 25, 2009

(65) Prior Publication Data

US 2009/0245044 A1 Oct. 1, 2009

(30) Foreign Application Priority Data

Mar. 26, 2008 (JP) .............................. 2008-080274

(51) Int. Cl.
*G11B 7/12* (2006.01)
*G11B 7/00* (2006.01)
(52) U.S. Cl. ................................. 369/47.53; 369/47.52
(58) Field of Classification Search ... 369/44.37–44.38, 369/47.49–47.55, 53.22–53.29, 53.31, 53.35–53.37, 369/59.11–59.13, 59.23–59.24, 94, 116, 369/275.1–275.4
See application file for complete search history.

(56) References Cited

U.S. PATENT DOCUMENTS

2007/0159942 A1* 7/2007 Takeshita et al. ......... 369/47.53

FOREIGN PATENT DOCUMENTS

| JP | 2006-016444 | 1/2006 |
|---|---|---|
| JP | 2006-164417 | 6/2006 |
| JP | 2007-164954 | 6/2006 |
| JP | 2008-140451 | 6/2008 |
| JP | 2008-140545 | 6/2008 |
| JP | 2009-104704 | 5/2009 |

OTHER PUBLICATIONS

Notification of Reasons for Rejection issued by JPO in the corresponding to the Japanese Patent Application No. 2008-080274 mailed on Jun. 9, 2009.

* cited by examiner

*Primary Examiner*—Wayne R Young
*Assistant Examiner*—Nathan A Danielsen
(74) *Attorney, Agent, or Firm*—Knobbe, Martens, Olson & Bear LLP

(57) ABSTRACT

Provided is an optical disc apparatus including: a recording unit configured to record data on an optical disc with laser lights of recoding powers set for first and second layers thereof; and a control unit configured to record/reproduce test data on/from these layers, determine first and second optimum recording powers for these layers, and set the determined first and second optimum recording powers in the recording unit, wherein the control unit changes the recording power across a predetermined search width, centering on a first recommended value for the first layer to determine the first optimum recording power, and corrects a second recommended value for the second layer on the basis of the first recommended value and the first optimum recording power and changes the recording power across the search width, centering on the corrected second recommended value to determine the second optimum recording power.

8 Claims, 6 Drawing Sheets

METHOD AND APPARATUS FOR DETERMINING RECORDING POWERS FOR RECORDING ON AN OPTICAL DISC

CROSS-REFERENCE TO RELATED APPLICATIONS

This application claims the benefit of priority of Japanese Patent Application No. 2008-080274, filed Mar. 26, 2008, the entire contents of which are incorporated herein by reference.

BACKGROUND

1. Field

The present invention relates to an optical disc apparatus and an optical disc recording and reproducing method. In particular, the invention relates to an optical disc apparatus and an optical disc recording and reproducing method in which data is recorded and reproduced on and from a multi-layered recording type optical disc.

2. Description of the Related Art

As recording type optical discs, there are commercially available, for example, DVD-R, DVD-RW, DVD-RAM, Blu-ray Disc (BD) and the like. In these recording type optical discs, it is well known that the quality of a reproduction signal depends on a laser power (a recoding power) or the like used upon recording. Therefore, there is generally performed such a processing that a test term is prepared within a predetermined time period such as immediately after an optical disc has been inserted into an optical disc apparatus and then data is tentatively written in a test recording area (also called PCA: Power Calibration Area) provided on the disc within the test term to obtain an optimum recording power. This processing is called OPC (Optimum Power Calibration).

In obtaining the optimum recording power, what should be used as an evaluation index is important. Although various evaluation indices have been conventionally proposed, a so-called asymmetry value β is now being widely used as the evaluation index.

The optimum recording power differs for different type of the optical disc used. Thus, on an optical disc of a certain type, a recording power which has been recommended in advance is recorded in its predetermined area so as to read this recommended recording power into an optical disc apparatus used when the optical disc is inserted into the apparatus.

In addition, there is now being widely used a method in which recommended recording powers for various types of the optical disc have been stored in an appropriate memory of an optical disc apparatus in the manufacturing course thereof so as to read out a recommended recording power corresponding to the type of the optical disc inserted into the apparatus from its memory.

The optimum recording power also differs in accordance with the characteristic of the optical disc apparatus used and the environmental condition such as the temperature or the like around the apparatus. Therefore, the optimum recording power cannot be determined simply from the recommended recording power for the optical disc concerned. Thus, test data is recorded in a test recording area while changing the recording power within a predetermined range, centering on the recommended recording power read out from the optical disc used or from the memory of the optical disc apparatus used. Then, the recorded test data is reproduced to determine a recording power with which an evaluation index is optimized as the optimum recording power.

JP-A 2006-164417 discloses, for a two-layered recording type optical disc, a technique for determining optimum recording powers for a first layer (a layer which is the closest to a light incident side) and a second layer situated on the inner side of the first layer of the optical disc. In this technique, a correlation characteristic between an asymmetry value β for the first layer and an asymmetry value β for the second layer is stored as a β characteristic. A recording depth of an area of the first layer which physically constitutes a layer ahead of an area to be subjected to the OPC of the second layer is made uniform, a recording power for the second layer is acquired from a power characteristic corresponding to this recording depth of the first layer and the OPC is performed by the recording power thus acquired, thereby to acquire the optimum recording power for the second layer.

However, the overshoot amount of recording pulses, distribution of light quantity thereof, the spot form of a laser beam to be irradiated and the like change in accordance with a change in environmental condition such as the temperature or the like. Therefore, by the technique disclosed in JP-A 2006-164417, the above mentioned correlation characteristic (the β characteristic) changes accordingly. That is, the recording power for the second layer acquired from the β characteristic between the first and second layers deviates from a genuine optimum power, because the previously stored correlation characteristic between the first and second layers has changed.

In order to cope with this problem, it is necessary to perform the OPC by shifting a recording power changing range for tentative writing (that is, the OPC should be retried), which results in extra consumption of time required for adjustment and excessive use of the PCA.

In addition, in general, the second layer is lower than the first layer in the sensitivity (the magnitude of change) of the asymmetry value β to the recording power. This fact means that when the asymmetry value-to-recording power characteristic changes with variations of temperature or the like, the second layer will exceed the first layer in the amount of the recording power which should be changed in order to maintain the optimum asymmetry value.

Therefore, in a case that the OPC is performed by changing the recording power within a predetermined search width, centering on a recommended recoding power, such a situation may occur that even though, in the first layer, the optimum asymmetry value can be obtained within the predetermined retrieval width, centering on a recommended recording power for the first layer, in the second layer, no optimum asymmetry value can be obtained within the same search width, centering on a recommended recording power for the second layer.

Also, in this case, the retrieval range should be shifted to retry the OPC, which results in an increase in time required for adjustment and excessive use of the PCA.

In a write-once type optical disc, even though some recording area for normal data still remains unused, when the predetermined PCA is used up, it will become impossible to newly record data on the optical disc concerned at that moment. For this reason, the excessive use of the PCA should be avoided as much as possible.

SUMMARY OF THE INVENTION

Accordingly, the present invention has been made in view of the above-mentioned circumstances, and it is an object of the present invention to provide an optical disc apparatus and an optical disc recording and reproducing method in which, in the OPC for determining an optimum recording power for each of layers constituting a multi-layered optical disc, the possibility to retry the OPC is eliminated as much as possible such that an increase in time required for the OPC processing can be prevented and use of the test recording area can be reduced.

In order to solve the above-mentioned problem, according to one aspect of the present invention, there is provided an optical disc apparatus including: a recording unit configured to record data on a recording type optical disc having first and second layers with laser light of a first recording power set for the first layer and laser light of a second recording power set for the second layer; and a control unit configured to record test data respectively on the first and second layers while changing the first and second recording powers, reproduce the test data thus recorded to determine a first optimum recording power for the first layer and a second optimum recording power for the second layer, and set the first and second optimum recording powers thus determined in the recording unit, wherein the control unit records the test data on the first layer while changing the recording power across a predetermined search width, centering on a first recommended value afforded to the first layer of the optical disc, thereby to determine the first optimum recording power, and corrects a second recommended value afforded to the second layer of the optical disc on the basis of the first recommended value and the first optimum recording power thus determined and records the test data on the second layer while changing the recording power across the predetermined search width, centering on the second recommended value thus corrected, thereby to determine the second optimum recording power.

In addition, in order to solve the above-mentioned problem, according to another aspect of the present invention, there is provided an optical disc recording and reproducing method including the steps of: (a) recording data on a recording type optical disc having first and second layers, with laser light of a first recording power set for the first layer and laser light of a second recording power set for the second layer; (b) recording test data respectively on the first and second layers while changing the recording powers, and reproducing the test data thus recorded, thereby determining a first optimum recording power for the first layer and a second optimum recording power for the second layer; and (c) setting the first and second optimum recording powers thus determined, wherein at the step (b), the test data is recorded on the first layer while changing the recording power across a predetermined search width, centering on a first recommended value afforded to the first layer of the optical disc, thereby to determine the first optimum recording power, and a second recommended value afforded to the second layer of the optical disc is corrected on the basis of the first recommended value and the first optimum recording power thus determined and the test data is recorded on the second layer while changing the recording power across the predetermined search width, centering on the second recommended value thus corrected, thereby to determine the second optimum recording power.

According to the optical disc apparatus and the optical disc recording and reproducing method of the present invention, in the OPC for determining the optimum recording power for each of the layers constituting the multi-layered optical disc, the possibility to retry the OPC is eliminated as much as possible such that the increase in time required for the OPC processing can be prevented and the use of the test recording area can be reduced.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Embodiments of an optical disc apparatus and an optical disc recording and reproducing method according to the present invention will be described with reference to the accompanying drawings.

(1) Configuration and Overall Operation of Optical Disc Apparatus

Figure 1:
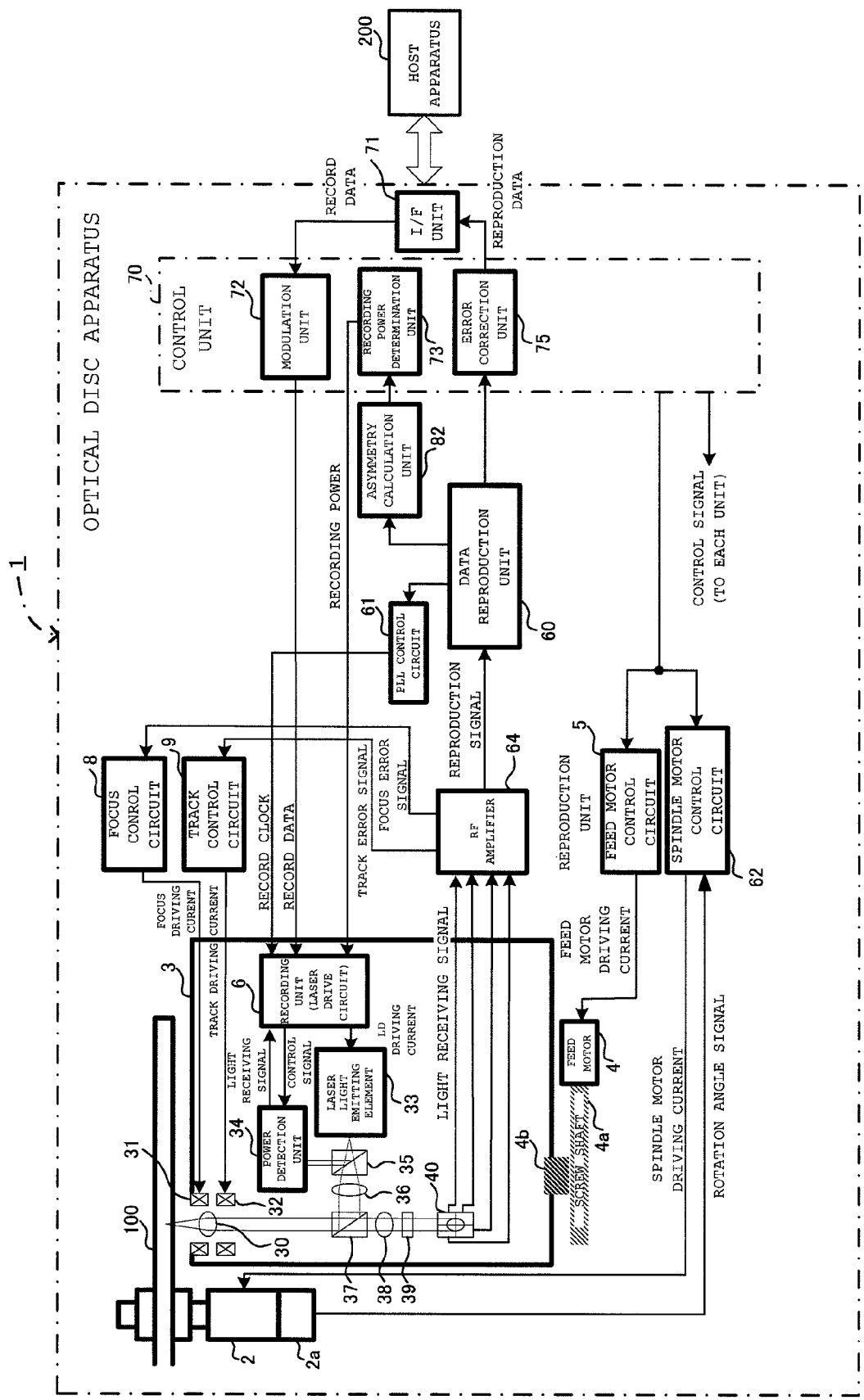
FIG. 1 is a block diagram illustrating a configuration example of an optical disc apparatus according to one embodiment of the present invention.

FIG. 1 is a diagram illustrating a configuration example of an optical disc apparatus 1 according to an embodiment of the present invention.

The optical disc apparatus 1 is configured to perform information recording and reproduction on a recording type optical disc 100 such as DVD-R, DVD-RW, DVD-RAM, Blu-ray Disc (BD) or the like. In the optical disc 100, a channel is carved spirally. A concave part of the channel is called a "groove" and a convex part thereof is called a "land". One circle of the groove or the land is called a "track". User data is recorded on the optical disc 100 along this track (only the groove, or the groove and the land) by forming marks and spaces corresponding to code lengths of data through irradiation with intensity-modulated laser light.

Reproduction of the data is performed by detecting changes in intensity of light reflected from the marks and spaces on the track through irradiation along the track with laser light having a reproducing power which is weaker than a power for recording.

The optical disc 100 is rotated and driven by a spindle motor 2. A rotation angle signal is output from a rotary encoder 2a provided on the spindle motor 2. The rotation angle signal is generated in the form of a signal of, for example, five pulses when the spindle motor 2 makes one revolution. Generation of this rotation angle signal makes it possible to judge the rotation angle and the number of revolutions of the spindle motor 2. A spindle motor control circuit 62 controls rotation and driving of the spindle motor 2 on the basis of information on the rotation angle and the number of revolutions.

Information recording and reproduction are performed on the optical disc 100 by an optical pickup 3. The optical pickup 3 is coupled to a feed motor 4 via a gear 4b and a screw shaft 4a. The feed motor 4 is controlled by a feed motor control circuit 5. As the feed motor 4 is rotated with a feed motor driving current supplied from the feed motor control circuit 5, the optical pickup 3 is moved in a radius direction of the optical disc 100.

In the optical pickup 3, there is provided an objective lens 30 supported by a wire or a leaf spring not shown in the drawing. The objective lens 30 is allowed to move in a focusing direction (an optical axis direction of the lens) by driving of a drive coil 31. Likewise, the objective lens 30 is allowed to move in a tracking direction (a direction orthogonal to the optical axis direction of the lens) by driving of a drive coil 32.

A laser drive circuit (a recording unit) 6 supplies a driving current for recording to a laser diode (a laser light emitting element) 33 on the basis of record data modulated by ETM (Eight to Twelve Modulation) method in a modulation unit 72. Into the modulation unit 72, there is supplied data for recording from a host apparatus 200 such as a personal computer or the like via an I/F unit 71.

On the other hand, the laser drive circuit 6 supplies a driving current for reading which is smaller than the driving current for writing to the laser diode 33 during information reading.

A power detection unit 34 constituted of a photo diode or the like (which may be referred to as a front monitor (FM) in some cases) is configured to divide part of the laser light emitted from the laser light emitting element 33 by use of a half mirror 35 at a given ratio and to detect a signal which is proportional to the quantity of light, that is, a light emission power, as a light receiving signal. The detected light receiving signal is supplied to the laser drive circuit 6. The laser drive circuit 6 controls the laser light emitting element 33, on the basis of the light receiving signal from the power detection unit 34, such that the light can be emitted by a recording power determined and set by a recording power determination unit 73 of a control unit 70.

The laser light emitting element 33 emits laser light in accordance with the driving current supplied from the laser drive circuit 6. The optical disc 100 is irradiated with the laser light emitted from the laser light emitting element 33 via a collimator lens 36, a half prism 37 and the objective lens 30.

On the other hand, light reflected from the optical disc 100 is guided to a light detector 40 via the objective lens 30, the half prism 37, a focusing lens 38, and a cylindrical lens 39.

The light detector 40 is constituted of, for example, four-partitioned light detection cells. Detection signals from these light detection cells are output to an RF amplifier 64. The RF amplifier 64 processes the detection signals from the light detection cells to generate a focus error signal FE indicative of an error from a just focused point, a tracking error signal TE indicative of an error between the beam spot center of the laser light and the center of the track and a reproduction signal which is a full addition signal of the signals from the light detection cells.

The focus error signal FE is supplied to a focus control circuit 8. The focus control circuit 8 generates a focus drive signal in accordance with the focus error signal FE. The generated focus drive signal is supplied to the drive coil 31 oriented in the focusing direction. As a result, there is performed focus servo control in which the laser light is always just-focused on a recording film of the optical disc 100.

On the other hand, the tracking error signal TE is supplied to a track control circuit 9. The track control circuit 9 generates a track drive signal in accordance with the tracking error signal TE. The track drive signal which is output from the track control circuit 9 is supplied to the drive coil 32 oriented in the tracking direction. As a result, there is performed tracking servo control in which the laser light always traces the track formed on the optical disc 100.

Execution of the focus servo control and the tracking servo control allows the focal point of the laser light to follow the track on the recording surface of the optical disc with high accuracy. As a result, the full addition signal RF of the output signals from the respective light detection cells of the light detector 40 comes to correctly reflecting changes of light reflected from the marks and the spaces formed on the track of the optical disc 100 corresponding to the recorded information and hence it becomes possible to obtain the reproduction signal of high quality.

This reproduction signal (the full addition signal RF) is input into a data reproduction unit 60. Part of the reproduction signal is input into a PLL control circuit 61. Then, from this PLL control circuit 61, there is generated a clock for recording or reproduction which is in synchronism with a period of a recording unit length.

The data reproduction unit 60 extracts two-valued or binary data from the reproduction signal to obtain decode data.

The decode data thus obtained is input into an error correction unit 75 in which, then, the data is subjected to an error correction processing and is output to the host apparatus 200 via the I/F unit 71.

On the other hand, part of a crest value of the reproduction signal is taken out from the data reproduction unit 60 and is input into an asymmetry calculation unit 82. In the asymmetry calculation unit 82, an asymmetry value $\beta$ is calculated as an evaluation index for determining the optimum recording power.

In the recording power determination unit 73 of the control unit 70, the optimum recording power is determined on the basis of the asymmetry value $\beta$ calculated by the asymmetry calculation unit 82 and the optimum recording power thus determined is set in a recording unit (a laser drive circuit) 6.

The optical disc apparatus according to the embodiment of the present invention features the OPC processing of determining the optimum recording power for the multi-layered recording type optical disc 100. Next, this OPC processing will be described in relation to a two-layered recording type optical disc by way of example.

(2) OPC Processing

Figure 2:
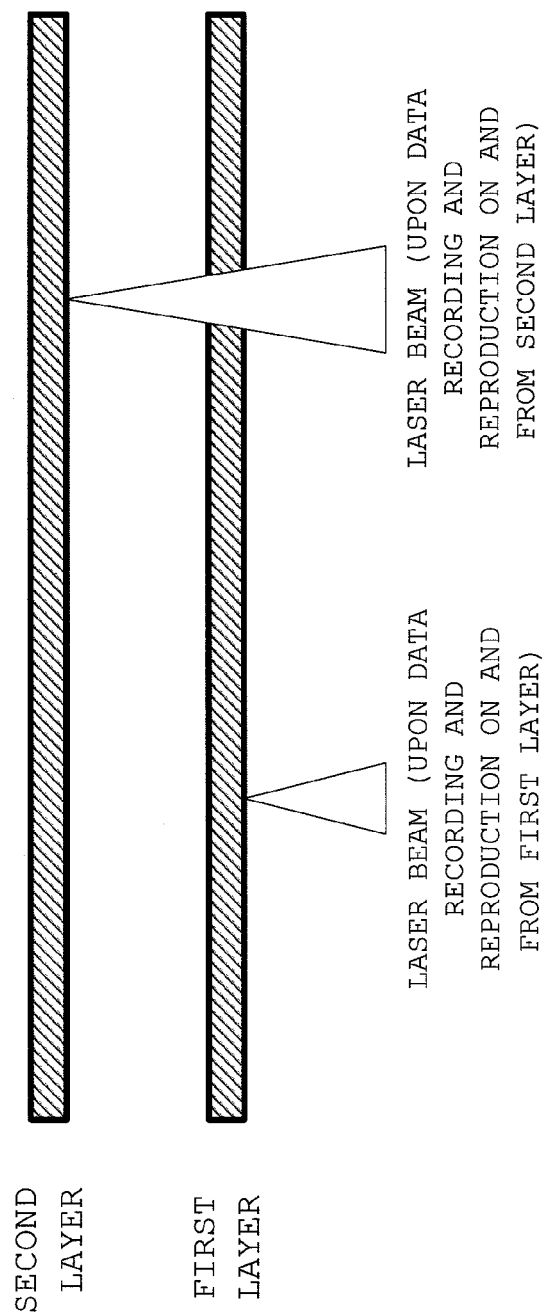
FIG. 2 is a diagram illustrating positional relations between laser beams and respective layers when data is recorded and reproduced on and from a two-layered recording type optical disc.

FIG. 2 is a sectional diagram schematically showing the configuration of the two-layered optical disc 100. A first layer is a layer which is the closest to a laser beam incident side and a second layer is a layer situated on the inner side of the first layer.

As shown in FIG. 2, in a case that data recording and reproduction are performed on the first layer, the position of the objective lens 30 is controlled in the focusing direction so as to position the focal point of a laser beam on a recording surface of the first layer. On the other hand, in a case that data recording and reproduction are performed on the second layer, the position of the objective lens 30 is controlled in the focusing direction so as to position the focal point of a laser beam on a recording surface of the second layer.

Figure 3A:
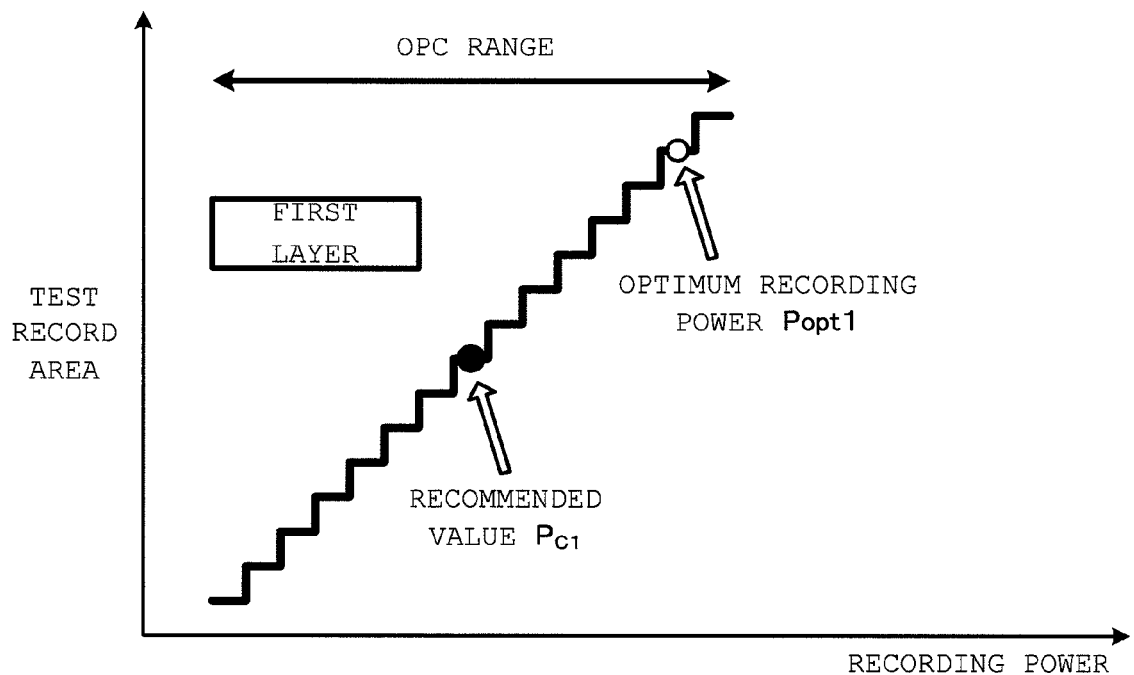
FIGS. 3A and 3B are diagrams illustrating a conventional method of performing the OPC processing on the two-layered recording type optical disc.
Figure 3B:
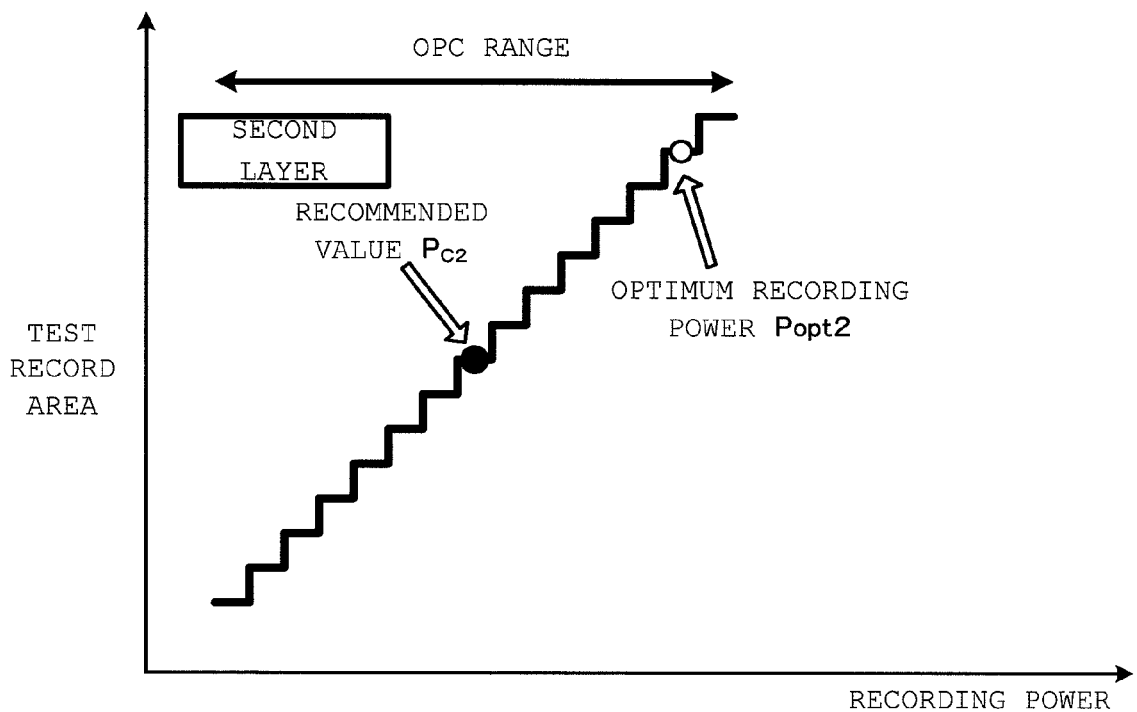

FIGS. 3A and 3B are diagrams illustrating an example of the OPC processing which has been conventionally performed on the two-layered optical disc, in which FIG. 3A is the diagram illustrating the OPC processing to be performed on the first layer and FIG. 3B is the diagram illustrating the OPC processing to be performed on the second layer. In each drawing, the horizontal axis represents a recording power. Each drawing shows a state that test data is being recorded in different test recording areas, that is, first in one test recording area (PCA), then in another test recording area and so on while changing the recording power by the OPC processing.

An OPC range, that is, a range within which the recording power is changed (a recording power search range for obtaining the optimum evaluation index (the asymmetry value β)) has a predetermined search width centering on a recommended recording power Pc1 or Pc2 for each layer. In the example shown in FIG. 3A or 3B, the recording power is changed at seven stages each in front of and behind the recommended recording power Pc1 or Pc2 as the center, that is, at fifteen stages in total.

Figure 4:
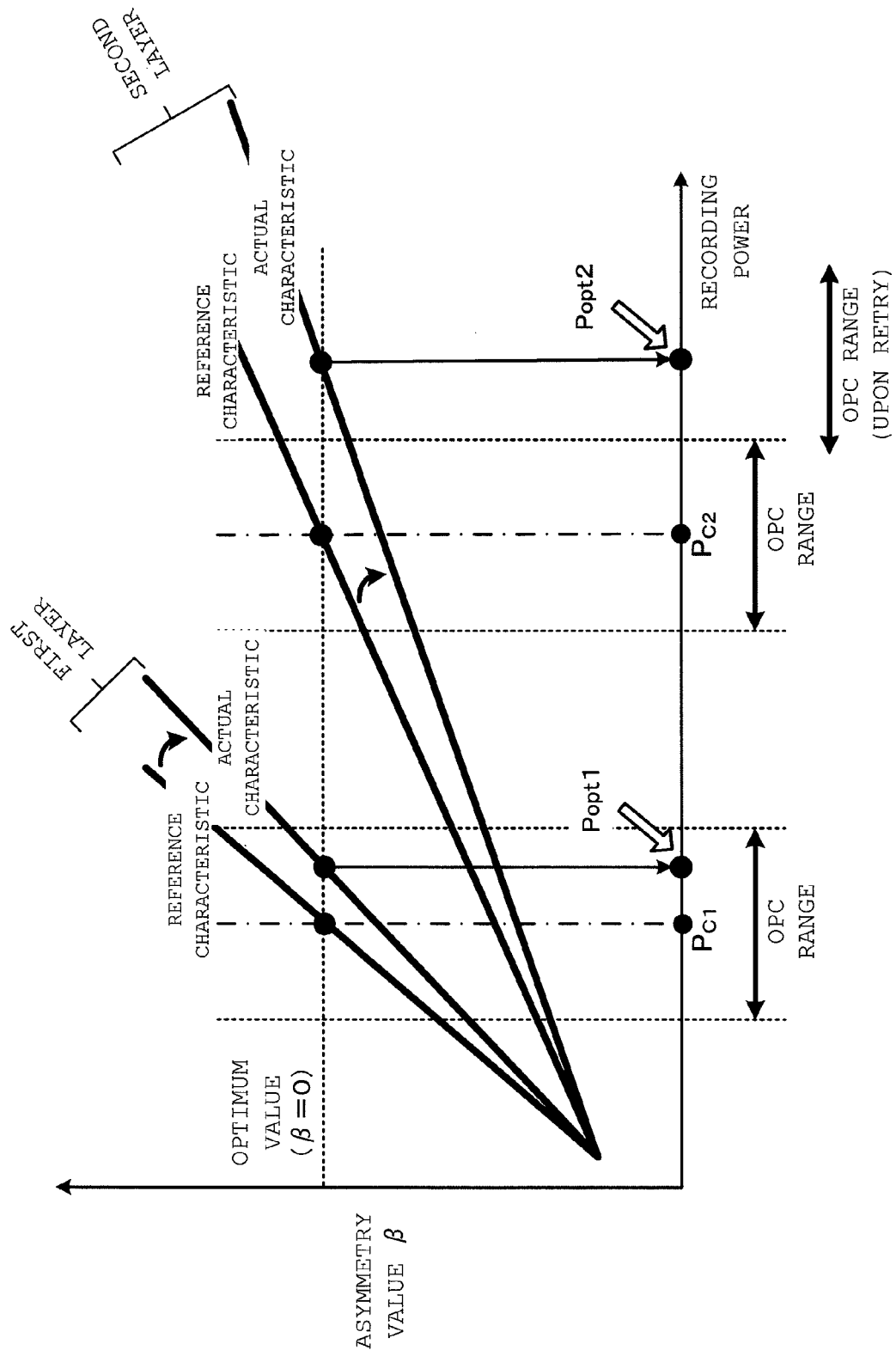
FIG. 4 is a diagram illustrating problems of the conventional OPC processing method.

Actually, the recommended recording power Pc1 for the first layer is different in value from the recommended recording power Pc2 for the second layer (see FIG. 4). However, for the convenience of explanation, the powers Pc1 and Pc2 are shown at the same positions in FIGS. 3A and 3B.

After the test data has been recorded on each layer, a test record area of each layer is reproduced to calculate the asymmetry value β as the evaluation index from the wave form of the reproduction signal.

Specifically, peak wave detection and bottom wave detection are performed using a DC level of a reproduced wave form as a reference to obtain a peak value VH and a bottom value VL. Then, the asymmetry value β indicative of the asymmetric property of the reproduced wave form is calculated from the peak value VH and the bottom value VL by the following equation:

$$\beta = (VH+VL)/(VH-VL) \qquad (1)$$

The smaller (the more approximate to zero) the asymmetry value β is, the higher the symmetric property of the wave form is and the more favorable the wave form is.

Thus, recording powers corresponding to the asymmetry value β which is the most approximate to zero are determined as optimum recording powers (an optimum recording power Popt1 for the first layer and an optimum recording power Popt2 for the second layer).

In this manner, in the conventional method, the recommended recording powers Pc1 and Pc2 themselves are used as the center values in the OPC range for both of the first and second layers.

As described above, the recommended recording powers Pc1 and Pc2 are recorded on the optical disc itself in some cases, or, in other cases, are stored in the memory of the optical disc apparatus in connection with the type of each optical disc used.

FIG. 4 is a diagram illustrating problems which would occur in the above mentioned conventional method. FIG. 4 shows features of an asymmetry value-to-recording power characteristic. In FIG. 4, the horizontal axis represents the recording power and the vertical axis represents the asymmetry value β. In general, as shown in FIG. 4, the second layer is lower than the first layer in the sensitivity (the magnitude of change) of the symmetry value β to the recording power.

FIG. 4 shows reference characteristic and "actual characteristic" for the first layer together with reference characteristic and "actual characteristic" for the second layer.

Here, the reference characteristic means a characteristic with which when the data is recorded on each layer by the recommended recording power Pc1 or Pc2, the optimum asymmetry value β (that is, β=0) can be obtained and is determined in consideration of the characteristic of a standard type optical disc apparatus and the environmental condition such as the standard temperature or the like as preconditions.

On the other hand, the "actual characteristic" means a characteristic including characteristics (mainly electric and optical characteristics of an optical pickup) peculiar to each optical disc apparatus into which an optical disc concerned is to be inserted and influences of environmental change such as temperature change or the like. The OPC processing means a processing to be performed every time data is recorded on the optical disc concerned because the "actual characteristic" is different from the reference characteristic, in order to determine the recording power by which the optimum asymmetry value β can be obtained for the "actual characteristic".

Typically, no significant difference is observed between the first and second layers in the degree of deviation of the "actual characteristic" from the reference characteristic (the degree of change in characteristic inclination). The reason therefore lies in that the same optical pickup is used in the same working environment.

However, the second layer is lower than the first layer in the sensitivity of the asymmetry value β to the recording power. Therefore, the second layer will exceed the first layer in the amount of the recording power to be changed in order to maintain the optimum asymmetry value when the characteristic of the layer changes from the reference characteristic to the "actual characteristic" as shown in FIG. 4.

Accordingly, when the OPC processing is performed by changing the recording power within the predetermined OPC range, centering on the recommended recording power, such a situation may occur that even though the optimum asymmetry value can be obtained for the first layer within its OPC range, no optimum asymmetry value can be obtained for the second layer within the same OPC range.

FIG. 4 shows an example in which the optimum value of the asymmetry value β cannot be obtained for the second layer within the OPC range centering on the recommended recording power Pc2. In this case, the center value in the OPC range should be shifted to again perform (retry) the OPC processing. As a result, the time required for the OPC processing is increased and the test recording area (PCA) is used more than needed.

In order to avoid retrying of the OPC processing, there can be conceived of such a method that the OPC range is extended for the second layer. However, even by this method, there is no change in situation that the OPC processing takes much time and the test record area is used more than needed.

In order to solve these problems, in the optical disc apparatus 1 according to the embodiment of the present invention, there is realized a method of effectively perform the OPC processing on the second layer by utilizing a result of the OPC processing performed on the first layer.

Figure 5:
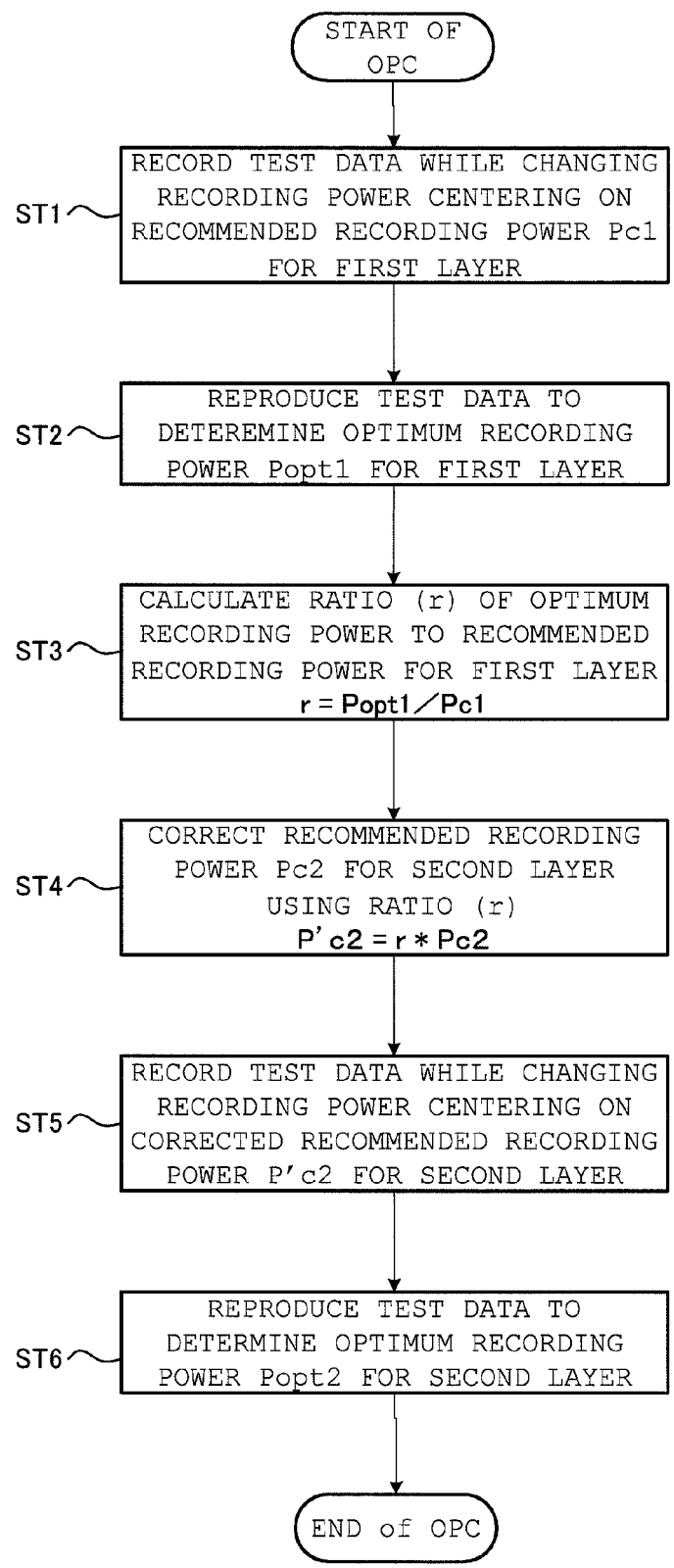
FIG. 5 is a flowchart showing one example of the OPC processing in the optical disc apparatus according to the embodiment of the present invention.
Figure 6A:
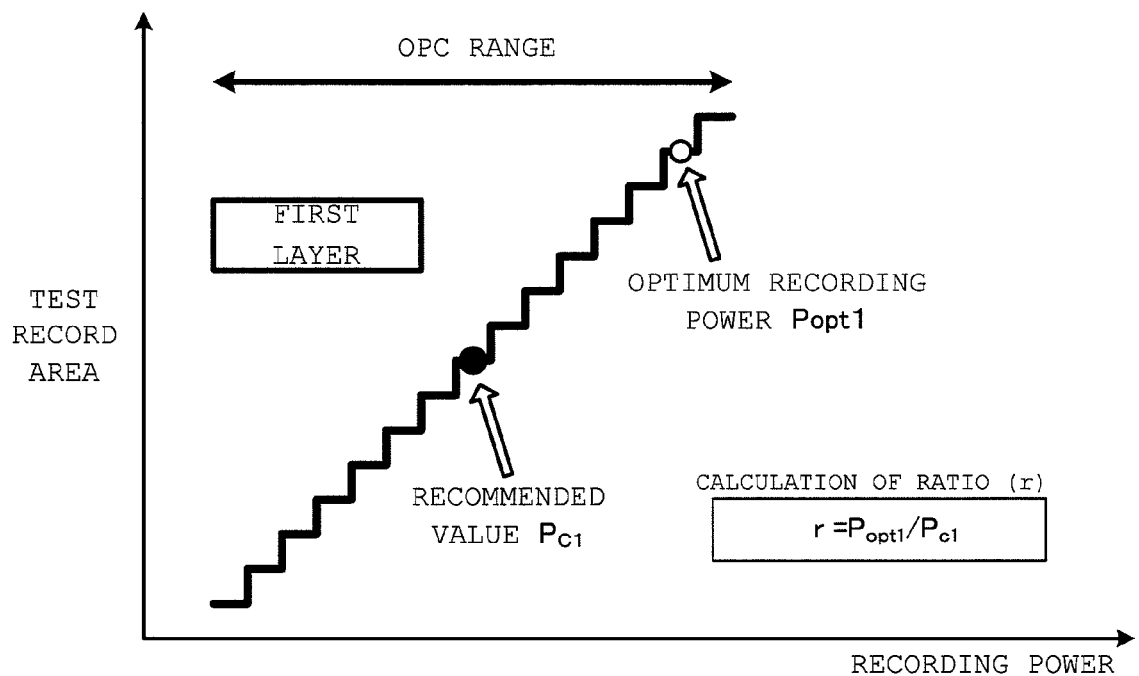
FIGS. 6A and 6B are diagrams illustrating the OPC processing in the optical disc apparatus according to the embodiment of the present invention.
Figure 6B:
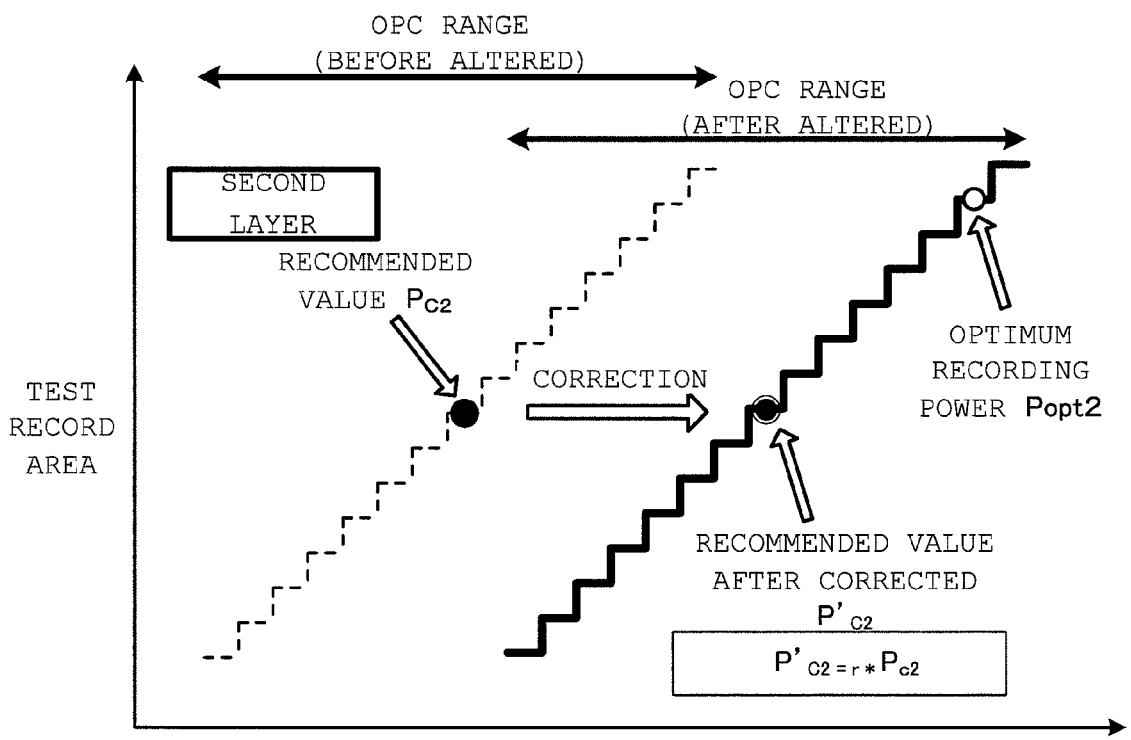

FIG. 5 is a flowchart showing an example of the OPC processing by the optical disc apparatus according to the embodiment of the present invention. FIGS. 6A and 6B are illustrations thereof.

First, at a step ST1 of the flowchart in FIG. 5, test data is recorded on the first layer while changing a recording power within an OPC range having a predetermined search width, centering on a recommended recording power Pc1 for the first layer (also see FIG. 6A).

Then, the test data recorded on the first layer is reproduced to obtain an asymmetry value β, and a recording power by which the optimum symmetry value β can be obtained is determined as an optimum recording power Popt1 for the first layer (a step ST2).

Then, the ratio (r) of the optimum recording power Popt1 to the recommended recording power Pc1 for the first layer is calculated from the following equation (2) (a step ST3):

$$r = Popt1/Pc1 \qquad (2)$$

Then, a recommended recording power Pc2 for the second layer is corrected by using the ratio (r) so as to obtain a corrected value P'c2 of the recommended recording power Pc2 (a step ST4). This correction is performed by using the following equation (3).

$$P'c2 = r*Pc2 \qquad (3)$$

Then, test data is recorded on the second layer while changing a recording power within an OPC range (which is the same as that for the first layer in the search width), centering on the corrected recommended recording power P'c2 for the second layer (a step ST5).

FIG. 6B is a diagram showing the OPC processing performed on the second layer. In the drawing, the broken line indicates the OPC processing with no correction of the recording power and the solid line indicates the OPC processing when the recording power has been corrected.

The above mentioned ratio (r) is an index indicating the degree of deviation of the "actual characteristic" from the reference characteristic (the degree of change in characteristic inclination). As described above, it is thought that there is no significant difference between the first and second layers in the ratio. Thus, in this embodiment, the center value within the OPC range is corrected so as to shift the OPC range for the second layer by using the ratio (r) obtained from the result of the OPC processing performed on the first layer.

As a result, even in a case that the recommended recording power Pc2 for the second layer greatly differs from the optimum recording power Popt2 for the second layer, it becomes possible to find out the optimum recording power Popt2 within the search width which is the same as that for the first layer with no need to retry the OPC processing or with no need to extend the OPC range.

Consequently, the increase in time required for the OPC processing can be prevented and the use of the test recording area can be reduced.

It should be noted that the present invention is not explicitly limited to the above-mentioned embodiments, and the present invention can be embodied in the implementing stage by modifying the components without departing from the scope of the invention. Also, various embodiments of the invention can be formed by appropriately combining the disclosed components of the above-mentioned embodiments. For example, some of the components may be deleted from all of the disclosed components according to the embodiments. Furthermore, components from different embodiments may be appropriately combined.

What is claimed is:

1. An optical disc apparatus comprising:
   a recording module configured to record data on a recording type optical disc comprising first and second layers with laser light of a first recording power set for the first layer and laser light of a second recording power set for the second layer; and
   a controller configured to record test data respectively on the first and second layers while changing the first and second recording powers, to reproduce the recorded test data in order to determine a first recording power for the first layer and a second recording power for the second layer, and to set the first and second recording powers determined in the recording module,
   wherein the controller is configured to record the test data on the first layer in order to determine the first recording power while changing the recording power with a predetermined search width and a first predetermined center value of the first layer of the optical disc, to correct a second predetermined center value of the second layer of the optical disc on the basis of the first predetermined center value and the first recording power, and to record the test data on the second layer while changing the recording power with the predetermined search width and the corrected second predetermined value in order to determine the second recording power.

2. The optical disc apparatus of claim 1, wherein the controller is configured to calculate a ratio of the first recording power to the first predetermined center value, to multiple the second predetermined center value by the calculated ratio, and to correct the second predetermined center value.

3. The optical disc apparatus of claim 1, wherein the first layer is a recording layer which is the closest to a light incident side of the optical disc and the second layer comprises at least one of recording layers which is not the recording layer of the first layer.

4. The optical disc apparatus of claim 1, wherein the controller is configured to reproduce the recorded test data in order to calculate an asymmetry value indicative of the asymmetric property of the reproduced data, and to determine recording powers configured to substantially decrease the absolute value of the asymmetry value within the search width as the first and second recording powers.

5. An optical disc recording and reproducing method for recording data on a recording type optical disc having first and second layers, with laser light of a first recording power set for the first layer and laser light of a second recording power set for the second layer, the method comprising:
   recording test data on the first and second layers while changing the recording powers, reproducing the test data thus recorded and determining a first recording power for the first layer and a second recording power for the second layer; and
   setting the first and second recording powers thus determined,
   wherein the test data is recorded on the first layer while changing the recording power with a predetermined search width and a first predetermined center value of the first layer of the optical disc in order to determine the first recording power at the recording and reproducing the test data and determining the recording powers, and
   a second predetermined center value of the second layer of the optical disc is corrected on the basis of the first predetermined center value and the determined first recording power and the test data is recorded on the second layer, while changing the recording power with the predetermined search width, and the corrected second predetermined center value, in order to determine the second recording power.

6. The optical disc recording and reproducing method of claim 5, wherein a ratio of the first recording power to the first predetermined center value is calculated and the second recommended value is multiplied by the calculated ratio in order to correct the second recommended value at the recording and reproducing the test data and determining the recording powers.

7. The optical disc recording and reproducing method of claim 5, wherein the first layer is a recording layer which is the closest to a light incident side of the optical disc and the second layer comprises at least one of recording layers which is not the recording layer of the first layer.

8. The optical disc recording and reproducing method of claim 5, wherein the recorded test data is reproduced, an asymmetry value indicative of the asymmetric property of the reproduced data is calculated, and recording powers configured to substantially minimize the absolute value of the asymmetry value within the search width are determined as the first and second recording powers, at the recording and reproducing the test data and determining the recording powers.

* * * * *